(12) United States Patent
Ideshio et al.

(10) Patent No.: US 10,232,845 B2
(45) Date of Patent: Mar. 19, 2019

(54) DRIVING SYSTEM FOR VEHICLE

(71) Applicant: TOYOTA JIDOSHA KABUSHIKI KAISHA, Toyota-shi, Aichi-ken (JP)

(72) Inventors: Yukihiko Ideshio, Nisshin (JP); Takahiko Tsutsumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 15/317,175

(22) PCT Filed: Jun. 17, 2015

(86) PCT No.: PCT/IB2015/000982
§ 371 (c)(1),
(2) Date: Dec. 8, 2016

(87) PCT Pub. No.: WO2016/001728
PCT Pub. Date: Jan. 7, 2016

(65) Prior Publication Data
US 2017/0129477 A1 May 11, 2017

(30) Foreign Application Priority Data
Jun. 30, 2014 (JP) .................. 2014-134196

(51) Int. Cl.
*B60W 20/50* (2016.01)
*B60K 6/387* (2007.10)
(Continued)

(52) U.S. Cl.
CPC ............. *B60W 20/50* (2013.01); *B60K 6/387* (2013.01); *B60K 6/40* (2013.01); *B60K 6/48* (2013.01);
(Continued)

(58) Field of Classification Search
CPC .............. B60W 20/50; B60W 50/029; B60W 50/0205; B60W 10/02; B60W 10/08;
(Continued)

(56) References Cited

U.S. PATENT DOCUMENTS

| 2007/0205031 | A1  | 9/2007  | Ogata |
|---|---|---|---|
| 2007/0215395 | A1* | 9/2007  | Ogata ..................... B60K 6/48 180/65.29 |
| 2009/0251831 | A1  | 10/2009 | Shiba et al. |

FOREIGN PATENT DOCUMENTS

| JP | 2003-284204 A | 10/2003 |
|---|---|---|
| JP | 2006-111260 A | 4/2006 |

(Continued)

OTHER PUBLICATIONS

A Translation of WO2014054534.*
Dec. 2, 2015 Written Opinion issued in International Patent Application No. PCT/IB2015/000982.

*Primary Examiner* — Nga X Nguyen
(74) *Attorney, Agent, or Firm* — Oliff PLC (57) ABSTRACT

In a vehicle that includes an engine including a starter, an automatic transmission unit having an input shaft coupled to an output shaft of the engine via a first clutch, and a motor generator (hereinafter, referred to as "MG") coupled to the input shaft of the automatic transmission unit via a second clutch, an electronic control unit starts up the engine with the use of the starter in a state where the MG is disconnected from the engine by releasing at least one of the first clutch or the second clutch when an IG-on operation has been made in an IG-off state (a state where the vehicle is stopped in a P range) and a power control unit that supplies electric power to the MG has a failure.

5 Claims, 9 Drawing Sheets

(51) Int. Cl.
*B60K 6/50* (2007.10)
*B60W 10/02* (2006.01)
*B60W 10/06* (2006.01)
*B60W 10/08* (2006.01)
*B60W 50/02* (2012.01)
*B60W 50/029* (2012.01)
*B60K 6/40* (2007.10)
*B60K 6/48* (2007.10)
*B60K 6/547* (2007.10)
*F16H 61/00* (2006.01)
*B60W 20/00* (2016.01)
*F02N 11/00* (2006.01)
*F02N 11/04* (2006.01)
*F02N 15/02* (2006.01)
*B60K 6/26* (2007.10)

(52) U.S. Cl.
CPC ............... *B60K 6/50* (2013.01); *B60K 6/547* (2013.01); *B60W 10/02* (2013.01); *B60W 10/06* (2013.01); *B60W 10/08* (2013.01); *B60W 50/0205* (2013.01); *B60W 50/029* (2013.01); *F16H 61/0031* (2013.01); *B60K 2006/268* (2013.01); *B60K 2006/4825* (2013.01); *B60W 20/00* (2013.01); *B60W 2510/0638* (2013.01); *B60W 2560/00* (2013.01); *B60W 2710/021* (2013.01); *B60W 2710/06* (2013.01); *B60W 2710/08* (2013.01); *B60Y 2200/92* (2013.01); *B60Y 2300/192* (2013.01); *B60Y 2300/42* (2013.01); *B60Y 2300/43* (2013.01); *B60Y 2300/63* (2013.01); *B60Y 2306/15* (2013.01); *B60Y 2400/42* (2013.01); *F02N 11/006* (2013.01); *F02N 11/04* (2013.01); *F02N 15/02* (2013.01); *F02N 2300/2002* (2013.01); *Y02T 10/6221* (2013.01); *Y02T 10/6252* (2013.01); *Y10S 903/914* (2013.01); *Y10S 903/915* (2013.01); *Y10S 903/93* (2013.01)

(58) Field of Classification Search
CPC ............. B60W 10/06; B60W 2560/00; B60W 2710/06; B60W 2710/021; B60W 2710/08; B60W 20/00; B60W 2510/0638; B60K 6/50; B60K 6/387; B60K 2006/4825; B60K 6/48; B60K 6/547; B60K 6/40; B60K 2006/268; F16H 61/0031; B60Y 2306/15; B60Y 2300/192; B60Y 2300/43; B60Y 2300/63; B60Y 2200/92; B60Y 2400/42; B60Y 2300/42; Y10S 903/914; Y10S 903/93; Y10S 903/915; F02N 15/02; F02N 11/04; F02N 11/006; F02N 2300/2002; Y02T 10/6221; Y02T 10/6252
USPC .................................. 701/53–54, 22, 54–54
See application file for complete search history.

(56) References Cited

FOREIGN PATENT DOCUMENTS

| | | | |
|---|---|---|---|
| JP | 2008-011683 | A | 1/2008 |
| JP | 2009-035128 | A | 2/2009 |
| JP | 2013-066326 | A | 4/2013 |
| WO | 2014/054534 | A1 | 4/2014 |
| WO | 2014/054723 | A1 | 4/2014 |
| WO | WO-2014054534 | A1 * | 4/2014 ............... B60K 6/48 |

* cited by examiner

DRIVING SYSTEM FOR VEHICLE

BACKGROUND OF THE INVENTION

1. Field of the Invention

The invention relates to a driving system for a vehicle and, more particularly, to a driving system for a vehicle (so-called hybrid vehicle) that is able to travel by using power of at least one of an engine or a motor generator.

2. Description of Related Art

Japanese Patent Application Publication No. 2009-35128 (JP 2009-35128 A) describes a hybrid vehicle. The hybrid vehicle includes an engine, a transmission, and a motor generator. The motor generator operates on electric power that is supplied from an inverter. An input shaft of the transmission is coupled to the engine via a first clutch. An output shaft of the transmission is coupled to drive wheels. The motor generator is coupled to the output shaft of the transmission via a second clutch. In this hybrid vehicle, when the first clutch is engaged and the second clutch is engaged, power of both the engine and the motor generator is allowed to be transmitted to the drive wheels.

SUMMARY OF THE INVENTION

However, in the hybrid vehicle described in JP 2009-35128 A, if the inverter that supplies electric power to the motor generator has a failure, there is a possibility that a short circuit is formed between the inverter and the motor generator. Therefore, when the engine is started up while the first clutch is engaged and the second clutch is engaged in a state where the inverter has a failure, a counter-electromotive force occurs inside the motor generator as a result of rotation of the motor generator by the power of the engine, and this counter-electromotive force may cause an overcurrent to flow through the short circuit formed between the inverter and the motor generator.

The invention enables start-up of an engine while suppressing flow of an overcurrent through a short circuit even when the short circuit is formed between a motor generator and a power control circuit because of a failure of the power control circuit that supplies electric power to the motor generator.

An aspect of the invention provides a driving system for a vehicle. The vehicle includes an engine, an automatic transmission, a power control circuit, a motor generator, a rotary electric machine, and a clutch mechanism. The automatic transmission includes an input shaft connected to an output shaft of the engine. The motor generator is connected to the input shaft of the automatic transmission. The motor generator is configured to operate on electric power that is supplied from the power control circuit. The rotary electric machine is configured to start up the engine by operating on electric power different from the electric power that is supplied from the power control circuit. The clutch mechanism is configured to transmit power between the engine and the motor generator or interrupt transmission of power between the engine and the motor generator. The driving system includes at least one electronic control unit. The at least one electronic control unit is configured to control the engine, the rotary electric machine and the clutch mechanism. The electronic control unit is configured to i) determine whether or not the power control circuit has a failure, and ii) when the power control circuit has a failure, execute start-up control. The start-up control is control for starting up the engine by operating the rotary electric machine in a state where the clutch mechanism is released.

With the above configuration, when the power control circuit (such as an inverter) has a failure, the engine is started up by operating the rotary electric machine (such as a starter or a starter generator) in a state where the clutch mechanism is released (a state where the motor generator is disconnected from the engine). Therefore, even when the engine is started up, the motor generator does not rotate. Thus, even when a short circuit is formed between the motor generator and the power control circuit because of a failure of the power control circuit, it is possible to start up the engine while suppressing flow of an overcurrent through the short circuit.

The clutch mechanism may include a first clutch and a second clutch. The first clutch may be provided between the motor generator and the input shaft of the automatic transmission. The second clutch may be provided between the output shaft of the engine and the input shaft of the automatic transmission. The start-up control may be control for starting up the engine by operating the rotary electric machine in a state where the first clutch is released.

With the above configuration, the engine is started up in a state where the first clutch is released (a state where the motor generator is disconnected from the input shaft of the automatic transmission). Therefore, even when the engine is started up, it is possible not to rotate the motor generator.

The start-up control may be control for starting up the engine by operating the rotary electric machine in a state where the first clutch is released and the second clutch is engaged.

With the above configuration, the engine is started up in a state where the first clutch is released and the second clutch is engaged (a state where the motor generator is disconnected from the input shaft of the automatic transmission and the engine is connected to the input shaft of the automatic transmission). Therefore, at engine start-up, it is possible to transmit the power of the engine to the automatic transmission while not rotating the motor generator. Therefore, in comparison with the case where the engine is started up in a state where the second clutch is released, it is possible to suppress a delay in response of transmission of driving force.

The clutch mechanism may include a first clutch and a second clutch. The first clutch may be provided between the motor generator and the input shaft of the automatic transmission. The second clutch may be provided between the output shaft of the engine and the input shaft of the automatic transmission. The start-up control may be control for starting up the engine by operating the rotary electric machine in a state where the second clutch is released.

With the above configuration, the engine is started up in a state where the second clutch is released (a state where the engine is disconnected from the input shaft of the automatic transmission). Therefore, at engine start-up, it is possible not to rotate the input shaft of the automatic transmission or the motor generator.

The vehicle may further include an electric oil pump. The electronic control unit may be configured to engage the second clutch by using a discharge hydraulic pressure of the electric oil pump when a rotation speed of the engine has decreased to a value lower than a first rotation speed after the engine has been started up in a state where the second clutch is released. The first rotation speed may be a rotation speed when a current that flows between the motor generator and the power control circuit is smaller than a permissible value due to a counter-electromotive force that generates through rotation of the motor generator in a state where the second clutch is engaged.

With the above configuration, after start-up of the engine, the second clutch is engaged after the rotation speed of the engine has decreased to a value lower than the first rotation speed. That is, immediately after engine start-up, an in-cylinder pressure is substantially atmospheric pressure, and the amount of in-cylinder air is large, so large torque is generated. Therefore, the rotation speed of the engine temporarily increases to a relatively high value. However, after a while, the in-cylinder pressure becomes a negative pressure (pressure lower than atmospheric pressure), the amount of in-cylinder air decreases, and torque decreases to a value smaller than the torque immediately after start-up. Therefore, the rotation speed of the engine begins to decrease. In consideration of this point, the second clutch is set in the released state at the beginning of start-up of the engine, and, after engine start-up, the second clutch is engaged after the rotation speed of the engine has decreased to a value lower than the first rotation speed. Thus, in comparison with the case where the second clutch is engaged from the beginning of start-up of the engine, it is possible to suppress the amount of increase in the rotation speed of the input shaft of the automatic transmission as a result of engagement of the second clutch. In addition, the first rotation speed is a rotation speed below which a current that flows between the motor generator and the power control circuit because of the counter-electromotive force of the motor generator is smaller than the permissible value. Therefore, even when the motor generator is rotated with rotation of the input shaft of the automatic transmission in a state where the second clutch is engaged, it is possible to suppress a current that flows between the motor generator and the power control circuit to a value smaller than the permissible value.

The first clutch may be configured such that the first clutch engages when no hydraulic pressure is supplied and the first clutch is released when a hydraulic pressure higher than or equal to a predetermined hydraulic pressure is supplied. The vehicle may further include a mechanical oil pump connected to the input shaft of the automatic transmission. The electronic control unit may be configured to release the first clutch by using a discharge hydraulic pressure of the mechanical oil pump when a rotation speed of the input shaft of the automatic transmission has increased to a value higher than a second rotation speed while the second clutch is engaged by using the discharge hydraulic pressure of the electric oil pump after the engine has been started up. The second rotation speed may be a rotation speed when the discharge hydraulic pressure of the mechanical oil pump is higher than the predetermined hydraulic pressure.

With the above configuration, when the rotation speed of the input shaft of the automatic transmission has increased to a value higher than the second rotation speed when the second clutch is engaged after start-up of the engine, the first clutch is released by using the discharge hydraulic pressure of the mechanical oil pump. The second rotation speed is a rotation speed above which the discharge hydraulic pressure of the mechanical oil pump is higher than the predetermined hydraulic pressure. Therefore, it is possible to ensure the hydraulic pressure for releasing the first clutch by using not the discharge hydraulic pressure of the electric oil pump but the discharge hydraulic pressure of the mechanical oil pump. Therefore, it is possible to reduce the size of the electric oil pump.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. Like reference numerals denote the same or corresponding portions in the drawings, and the description thereof will not be repeated.

First Embodiment

Figure 1:
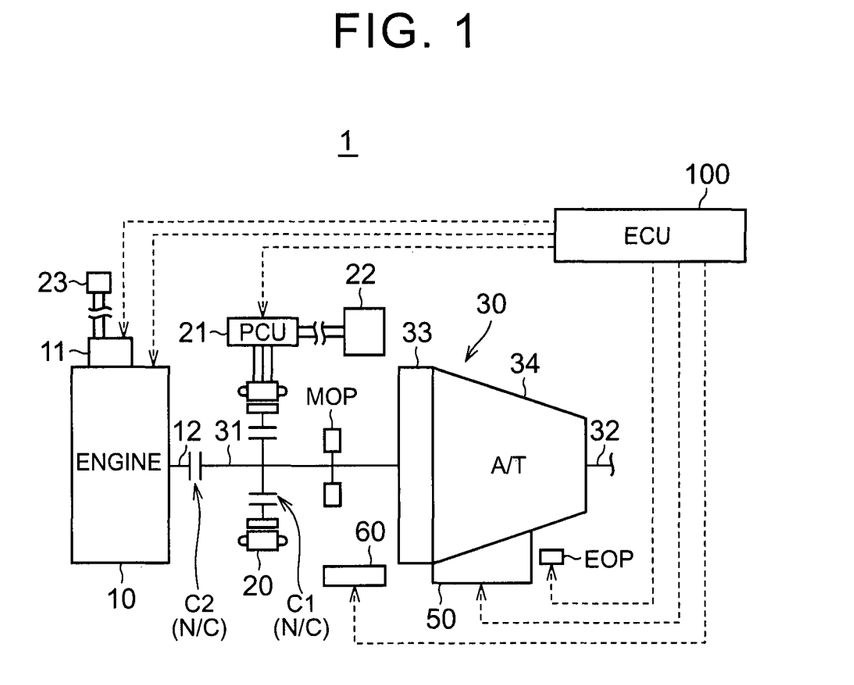
FIG. 1 is a first overall configuration view of a driving system for a vehicle.

FIG. 1 is an overall configuration view of a driving system for a vehicle 1 according to the present embodiment. The driving system for the vehicle 1 includes an engine 10, a starter 11, a motor generator (hereinafter, also referred to as "MG") 20, a power control circuit (hereinafter, referred to as "power control unit (PCU)") 21, a high-voltage battery 22, a low-voltage battery 23, an automatic transmission unit 30, a first clutch C1, a second clutch C2, hydraulic circuits 50, 60, a mechanical oil pump MOP, an electric oil pump EOP, and an electronic control unit (hereinafter, referred to as "ECU") 100.

The vehicle 1 is a hybrid vehicle. The hybrid vehicle travels as a result of transmission of power of at least one of the engine 10 or the MG 20 to drive wheels via the automatic transmission unit 30.

The engine 10 is an internal combustion engine, such as a gasoline engine and a diesel engine. The starter 11 is a rotary electric machine for cranking the engine 10. The starter 11 may be a starter generator that also has the function of a generator. The starter 11 operates on low-voltage electric power that is supplied from the low-voltage battery 23. The low-voltage battery 23 stores electric power to be supplied to an auxiliary that operates at a low voltage.

The auxiliary that operates at a low voltage is, for example, the above-described starter 11.

An input shaft 31 of the automatic transmission unit 30 is coupled to an output shaft 12 of the engine 10 via the second clutch C2. The output shaft 32 of the automatic transmission unit 30 is coupled to the drive wheels (not shown). The automatic transmission unit 30 according to the present embodiment includes a torque converter 33 and an automatic transmission 34.

A shift range of the automatic transmission 34 is selected from among a plurality of shift ranges. The plurality of shift ranges include a forward running range (D range), a reverse running range (R range), a parking range (P range), a neutral range (N range), and the like. For example, when an IG switch (not shown) is turned off by a user (hereinafter, referred to as "IG-off state"), the shift range of the automatic transmission 34 is set to the P range. In the P range, the output shaft 32 of the automatic transmission unit 30 is fixed (P lock), and the output shaft 32 of the automatic transmission unit 30 is disconnected from the input shaft 31.

The MG 20 is typically a three-phase permanent magnet synchronous motor. That is, permanent magnets are embedded in the rotor of the MG 20. Three-phase coils are wound in the stator of the MG 20. The other ends of the three-phase coils are connected to one another at a neutral point. The three-phase coils include a U-phase coil, a V-phase coil and a W-phase coil.

The rotor of the MG 20 is coupled to the input shaft 31 of the automatic transmission unit 30 via the first clutch C1. The MG 20 is driven by high-voltage electric power that is supplied from the high-voltage battery 22 via the PCU 21. The MG 20 generates electric power as the MG 20 is rotated by power that is transmitted from the input shaft 31 of the automatic transmission unit 30 (power that is transmitted from the engine 10 or the drive wheels). The high-voltage battery 22 stores electric power to be supplied to the MG 20 that operates at a high voltage.

The PCU 21 includes a converter and an inverter. The converter steps up voltage that is input from the high-voltage battery 22 and then outputs the stepped-up voltage to the inverter. In addition, the converter steps down voltage that is input from the inverter and then outputs the stepped-down voltage to the high-voltage battery 22. The inverter converts direct current, which is input from the converter, to three-phase alternating currents and then outputs the three-phase alternating currents to the MG 20. In addition, the inverter converts three-phase alternating currents, which are input from the MG 20, to direct current and then outputs the direct current to the converter.

The mechanical oil pump MOP is mechanically coupled to the input shaft 31 of the automatic transmission unit 30, and operates as the input shaft 31 rotates. Thus, as the rotation speed of the input shaft 31 of the automatic transmission unit 30 increases, a discharge hydraulic pressure (hereinafter, also referred to as "MOP pressure") of the mechanical oil pump MOP increases. When the input shaft 31 of the automatic transmission unit 30 is not rotating, the mechanical oil pump MOP stops.

The electric oil pump EOP operates by using a motor as a power source. The motor operates on the basis of a control signal from the ECU 100. Thus, even when the input shaft 31 of the automatic transmission unit 30 is not rotating (that is, when the mechanical oil pump MOP is stopped), the electric oil pump EOP is operable. The electric oil pump EOP is used in an auxiliary manner, for example, when the mechanical oil pump MOP is stopped. Therefore, the maximum value of the discharge hydraulic pressure (hereinafter, also referred to as "EOP pressure") of the electric oil pump EOP is set to a value lower than the maximum value of the MOP pressure. In this way, the size of the electric oil pump EOP is reduced.

Each of the mechanical oil pump MOP and the electric oil pump EOP introduces hydraulic oil stored in an oil pan 70 (see FIG. 2) and then discharges the hydraulic oil to the hydraulic circuits 50, 60. The hydraulic circuits 50, 60 regulate hydraulic pressure that is supplied from the electric oil pump EOP or the mechanical oil pump MOP and then supply the hydraulic pressure to the automatic transmission unit 30, the first clutch C1 and the second clutch C2.

The first clutch C1 according to the present embodiment is engaged in a normal state where no hydraulic pressure is supplied, and is released in a state where a hydraulic pressure higher than or equal to a predetermined release hydraulic pressure P1 is supplied. The first clutch C1 is a so-called normally closed (hereinafter, also referred to as "N/C") clutch. Similarly, the second clutch C2 according to the present embodiment is engaged in a normal state, and is released when a hydraulic pressure higher than or equal to a predetermined release hydraulic pressure P2 is supplied. The second clutch C2 is an N/C clutch.

A plurality of sensors (which are not shown) for detecting physical quantities that are required to control the vehicle 1 are provided in the vehicle 1. The physical quantities include a user's accelerator pedal operation amount, the rotation speed of the engine 10 (hereinafter, referred to as "engine rotation speed Ne"), the rotation speed of the MG 20 (hereinafter, also referred to as "MG rotation speed Nm"), the rotation speed of the input shaft 31 of the automatic transmission unit 30 (hereinafter, also referred to as "input shaft rotation speed Nat"), and the like. These sensors transmit detected results to the ECU 100.

The ECU 100 includes a central processing unit (CPU) (not shown) and an internal memory (not shown). The ECU 100 starts up when the user makes an operation for starting up the vehicle 1 (an operation for changing the IG switch (not shown) from an off state to an on state; hereinafter, also referred to as "IG-on operation"). When the ECU 100 starts up through the IG-on operation, the ECU 100 executes a predetermined computing process on the basis of information from the sensors and information stored in the memory, and controls the devices of the vehicle 1 on the basis of the computed results.

The ECU 100 causes the vehicle 1 to travel in any one of motor running, hybrid running and engine running.

In motor running, the ECU 100 engages the first clutch C1 (couples the MG 20 to the input shaft 31 of the automatic transmission unit 30) and releases the second clutch C2 (disconnects the engine 10 from the input shaft 31 of the automatic transmission unit 30), thus allowing the input shaft 31 of the automatic transmission unit 30 to rotate on the power of the MG 20.

In hybrid running, the ECU 100 engages the first clutch C1 (couples the MG 20 to the input shaft 31 of the automatic transmission unit 30) and engages the second clutch C2 (couples the engine 10 to the input shaft 31 of the automatic transmission unit 30), thus allowing the input shaft 31 of the automatic transmission unit 30 to rotate on the power of at least one of the engine 10 or the MG 20.

In engine running, the ECU 100 releases the first clutch C1 (disconnects the MG 20 from the input shaft 31 of the automatic transmission unit 30) and engages the second clutch C2 (couples the engine 10 to the input shaft 31 of the automatic transmission unit 30), thus allowing the input shaft 31 of the automatic transmission unit 30 to rotate on the power of the engine 10. In this state, the MG 20 is disconnected from the powertrain, so a similar configuration to that of a normal engine vehicle including an automatic transmission between an engine and drive wheels is provided.

Figure 2:
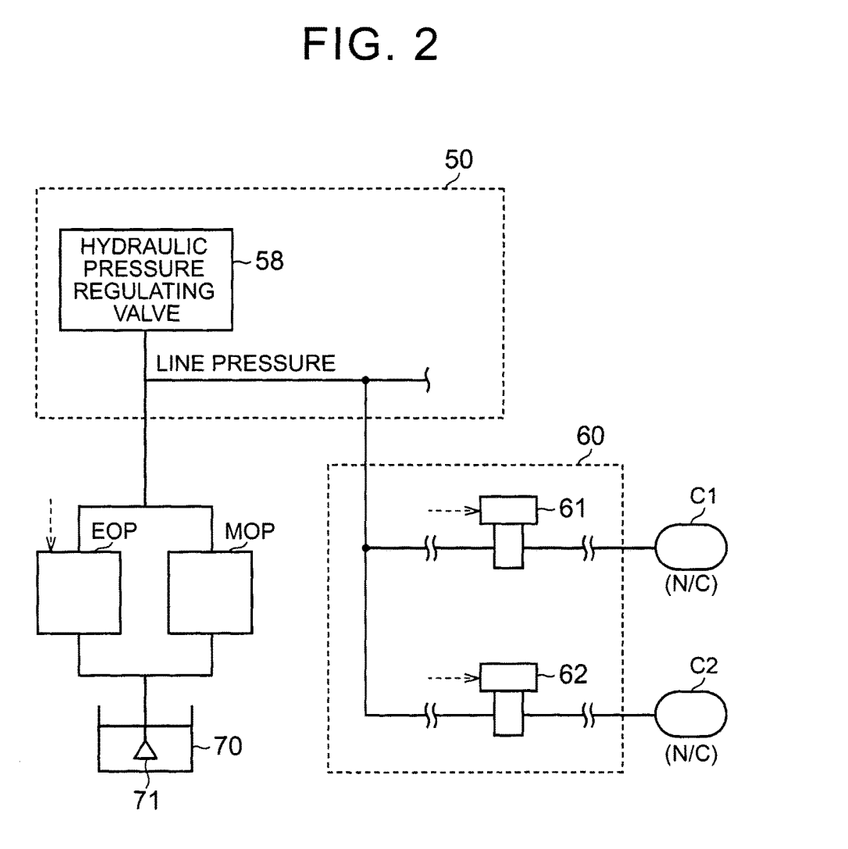
FIG. 2 is a view that schematically shows a circuit configuration for supplying hydraulic pressures to a first clutch C1 and a second clutch C2.

FIG. 2 is a view that schematically shows a circuit configuration for supplying hydraulic pressures to the first clutch C1 and the second clutch C2. This circuit includes the electric oil pump EOP, the mechanical oil pump MOP, the hydraulic circuits 50, 60 and the oil pan 70. The hydraulic circuit 50 includes a hydraulic pressure regulating valve 58. The hydraulic circuit 60 includes solenoid valves 61, 62.

When at least one of the electric oil pump EOP or the mechanical oil pump MOP operates, hydraulic oil stored inside the oil pan 70 is drawn via a strainer 71 and is discharged to the hydraulic circuit 50.

The hydraulic pressure regulating valve 58 of the hydraulic circuit 50 adjusts the hydraulic pressure of hydraulic oil, discharged from at least one of the electric oil pump EOP or the mechanical oil pump MOP, to a predetermined hydraulic pressure. The hydraulic pressure (hereinafter, also referred to as "line pressure") adjusted by the hydraulic pressure regulating valve 58 is supplied to each of the solenoid valves 61, 62 of the hydraulic circuit 60.

The solenoid valve 61 adjusts the hydraulic pressure, which is supplied to the first clutch C1, in accordance with a command pressure based on a control signal from the ECU 100 by using the line pressure as a source pressure. The first clutch C1 is an N/C clutch as described above. The first clutch C1 is engaged in the normal state, and is released in the state where a hydraulic pressure higher than or equal to the predetermined release hydraulic pressure P1 is supplied from the solenoid valve 61.

The solenoid valve 62 adjusts the hydraulic pressure, which is supplied to the second clutch C2, in accordance with a command pressure based on a control signal from the ECU 100 by using the line pressure as a source pressure. The second clutch C2 is an N/C clutch as described above. The second clutch C2 is engaged in the normal state, and is released in the state where a hydraulic pressure higher than or equal to the predetermined release hydraulic pressure P2 is supplied from the solenoid valve 62.

In the vehicle 1 having the above configuration, when the user makes the IG-on operation in the IG-off state (the state where the vehicle 1 is stopped in the P range), if the PCU 21 has a failure, the power of the MG 20 is not obtained and the vehicle 1 is required to travel by using the power of the engine 10. Therefore, the engine 10 needs to be started up.

However, when the PCU 21 has a failure, if the engine 10 is started up while the first clutch C1 and the second clutch C2 are engaged (normal state), there is a concern that an overcurrent flows between the MG 20 and the PCU 21.

That is, when the PCU 21 has a failure (for example, when one phase of the inverter in the PCU 21 is short-circuited), there is a possibility that a short circuit is formed between the MG 20 and the PCU 21. If the engine 10 is started up while the first clutch C1 and the second clutch C2 are engaged, the rotor of the MG 20 is drawn by rotation of the engine 10, and rotates. Because the permanent magnets are embedded in the rotor of the MG 20, temporal and positional changes in magnetic flux occur in the coils in the stator as the rotor rotates, with the result that a counter-electromotive force corresponding to the rotation speed of the rotor occurs. There is a concern that an overcurrent flows through the short circuit formed between the MG 20 and the PCU 21 because of the counter-electromotive force.

When the IG-on operation is made in the IG-off state (the state where the vehicle 1 is stopped in the P range) and the PCU 21 has a failure, the ECU 100 according to the present embodiment executes control for starting up the engine 10 with the use of the starter 11 in a state where the MG 20 is disconnected from the engine 10 by releasing at least one of the first clutch C1 or the second clutch C2. Hereinafter, this control is also referred to as "PCU-abnormality start-up control". The starter 11 operates on electric power from the low-voltage battery 23.

Figure 3:
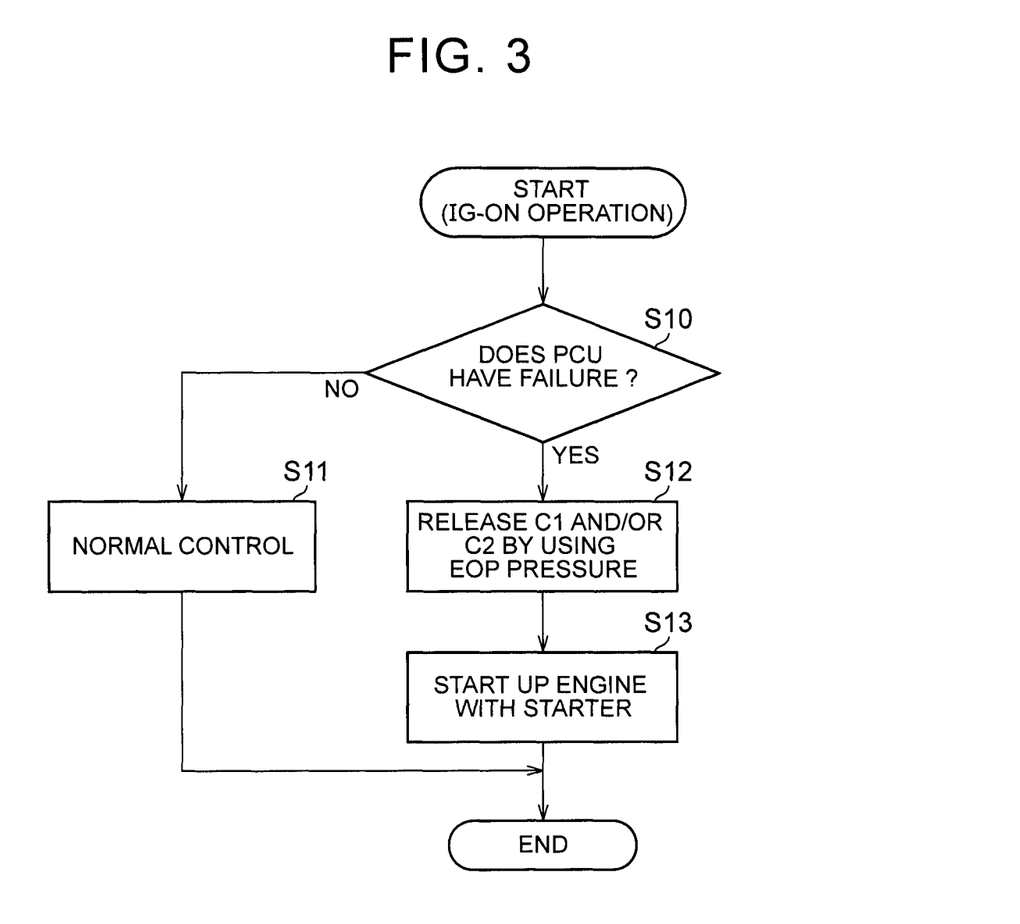
FIG. 3 is a first flowchart that shows the procedure of an ECU.

FIG. 3 is a flowchart that shows the procedure at the time when the ECU 100 executes start-up control. This flowchart is started when the IG-on operation is made in the IG-off state (the state where the vehicle 1 is stopped in the P range). Both the electric oil pump EOP and the mechanical oil pump MOP are stopped at the time of the start of this flowchart, so both the N/C first clutch C1 and the N/C second clutch C2 are engaged.

In step (hereinafter, step is abbreviated as "S") 10, the ECU 100 determines whether the PCU 21 has a failure. For example, the ECU 100 determines, on the basis of a PCU fail flag, whether the PCU 21 has a failure. The PCU fail flag is stored in the internal memory. The PCU fail flag is a flag that indicates whether the PCU 21 has a failure (for example, a one-phase short-circuit failure of the inverter). The PCU fail flag is set to an off state when the PCU 21 has no failure; whereas the PCU fail flag is changed to an on state when the PCU 21 has a failure (for example, when a phase current flows although all the gates of the three-phase switching elements of the inverter are interrupted). The latest PCU fail flag is stored in the internal memory of the ECU 100, and is also held in the IG-off state. The ECU 100 reads the PCU fail flag stored in the internal memory, and determines that the PCU 21 has a failure when the PCU fail flag is in the on state.

When the PCU 21 has no failure (NO in S10), the ECU 100 executes normal control. In normal control, whether the engine 10 is started up is selected as needed. For example, when the state of charge of the high-voltage battery 22 is high and the vehicle 1 is allowed to start moving by using the power of the MG 20 without using the power of the engine 10, the engine 10 is not started up. On the other hand, when the state of charge of the high-voltage battery 22 is low and the vehicle 1 cannot start moving by only the power of the MG 20, the engine 10 is started up. When the engine 10 is started up in normal control, the ECU 100 starts up the engine 10 by cranking the engine 10 with the use of not the starter 11 but the MG 20.

When the PCU 21 has a failure (YES in S10), the ECU 100, in S12, controls the solenoid valves 61, 62 of the hydraulic circuit 60 such that at least one of the first clutch C1 or the second clutch C2 is released using the EOP pressure by operating the electric oil pump EOP.

After that, the ECU 100, in S13, starts up the engine 10 with the use of the starter 11. Specifically, the ECU 100 cranks the engine 10 by operating the starter 11, and, when the engine rotation speed increases to a predetermined value through cranking, starts ignition control over the engine 10. After ignition control over the engine 10 has been started, the starter 11 is stopped.

Figure 4:
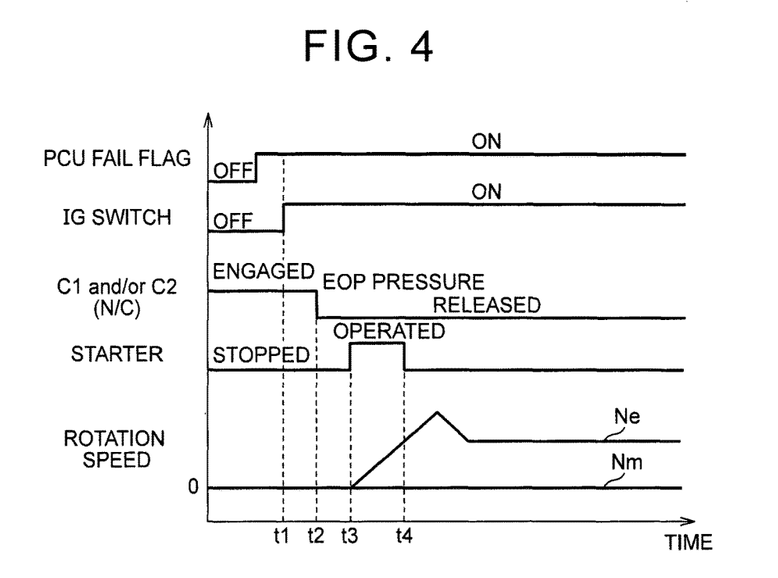
FIG. 4 is a timing chart that shows an example of changes in engine rotation speed Ne and MG rotation speed Nm in the case where the ECU executes PCU-abnormality start-up control.

FIG. 4 is a timing chart that shows an example of changes in engine rotation speed Ne and MG rotation speed Nm in the case where the ECU 100 executes PCU-abnormality start-up control.

Before time t1, it is in the IG-off state (the state where the vehicle 1 is stopped in the P range). In the example shown in FIG. 4, the PCU fail flag is set to the on state before time t1, and is stored in the internal memory of the ECU 100.

When the IG-on operation is made at time t1, the PCU fail flag stored in the internal memory of the ECU 100 is read, and the read PCU fail flag is in the on state. Thus, it is determined that the PCU 21 has a failure. Therefore, at time t2, at least one of the first clutch C1 or the second clutch C2 is released by using the EOP pressure. Thus, the MG 20 is disconnected from the engine 10.

Thereafter, at time t3, cranking of the engine 10 is started with the use of the starter 11. Thus, the engine rotation speed Ne begins to increase. When ignition control over the engine 10 is started at time t4, the engine rotation speed Ne further increases. That is, immediately after the start of ignition control, the in-cylinder pressure of the engine 10 is substantially atmospheric pressure, and the amount of in-cylinder air is large, so large torque is generated. Therefore, the engine rotation speed Ne temporarily increases to a relatively high value. After a while, the in-cylinder pressure becomes a negative pressure (a pressure lower than atmospheric pressure), and the amount of in-cylinder air decreases, so torque decreases to a value smaller than the torque immediately after start-up. Therefore, the engine rotation speed Ne begins to decrease.

In this way, the engine rotation speed Ne changes as a result of start-up of the engine 10 after time t3. However, at least one of the first clutch C1 or the second clutch C2 is released (the MG 20 is disconnected from the engine 10), so the MG rotation speed Nm is kept at zero without any change. Therefore, even when a short circuit is formed between the MG 20 and the PCU 21 as a result of a failure of the PCU 21, it is possible to suppress flow of an overcurrent through the short circuit.

As described above, when the IG-on operation is made in the IG-off state (the state where the vehicle 1 is stopped in the P range) and the PCU 21 has a failure, the ECU 100 according to the present embodiment starts up the engine 10 with the use of the starter 11 in a state where the MG 20 is disconnected from the engine 10 by releasing at least one of the first clutch C1 or the second clutch C2. Therefore, even when the engine 10 is started up, the MG 20 does not rotate. Thus, even when a short circuit is formed between the MG 20 and the PCU 21 because of a failure of the PCU 21, it is possible to start up the engine 10 while suppressing flow of an overcurrent through the short circuit.

Alternative Embodiments to First Embodiment

In the above-described first embodiment, the invention is applied to the vehicle 1 including the first clutch C1, the second clutch C2 and the torque converter 33; however, a vehicle to which the invention is applicable is not limited to the above-described vehicle 1.

Figure 5:
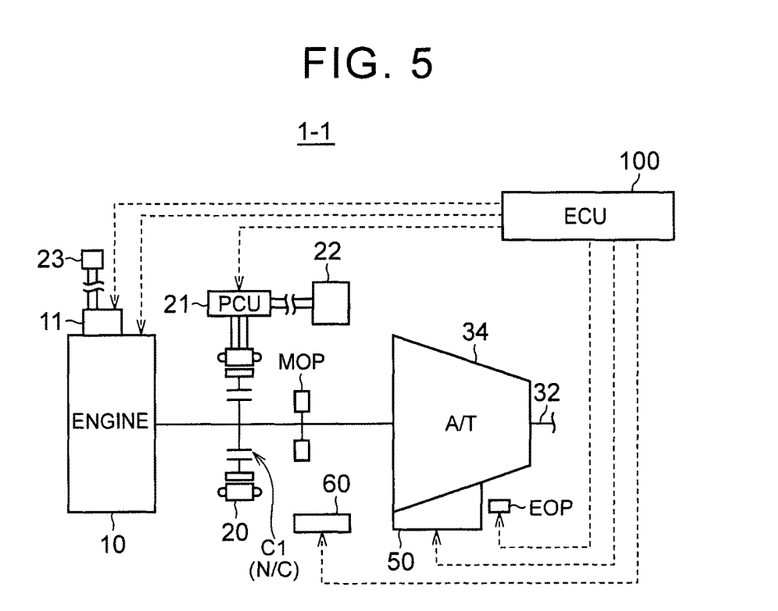
FIG. 5 is a second overall configuration view of a driving system for a vehicle.

For example, the invention is applicable to a vehicle 1-1 shown in FIG. 5. The vehicle 1-1 shown in FIG. 5 differs from the vehicle 1 according to the above-described first embodiment in that the second clutch C2 and the torque converter 33 are omitted. When the invention is applied to the thus configured vehicle 1-1, the engine 10 just needs to be started up with the use of the starter 11 by releasing the first clutch C1 when the IG-on operation is made in the IG-off state and the PCU 21 has a failure.

Figure 6:
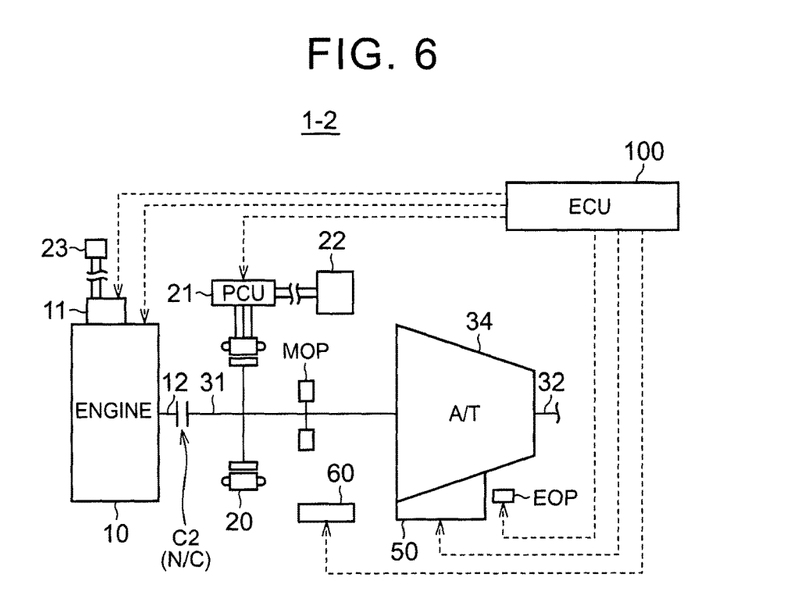
FIG. 6 is a third overall configuration view of a driving system for a vehicle.

For example, the invention is also applicable to a vehicle 1-2 shown in FIG. 6. The vehicle 1-2 shown in FIG. 6 differs from the vehicle 1 according to the above-described first embodiment in that the first clutch C1 and the torque converter 33 are omitted. When the invention is applied to the thus configured vehicle 1-2, the engine 10 just needs to be started up with the use of the starter 11 by releasing the second clutch C2 when the IG-on operation is made in the IG-off state and the PCU 21 has a failure.

Second Embodiment

Figure 7:
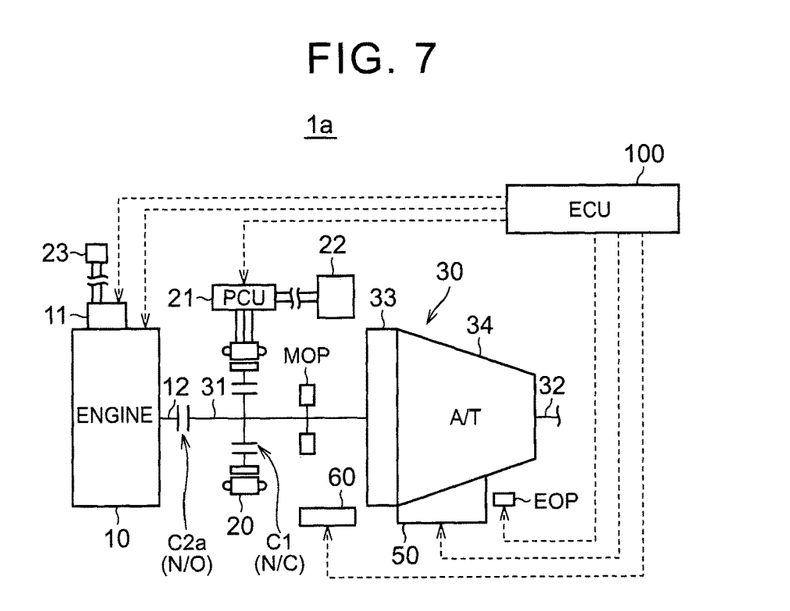
FIG. 7 is a fourth overall configuration view of a driving system for a vehicle.

FIG. 7 is an overall configuration view of a driving system for a vehicle 1a according to a second embodiment. In the vehicle 1a, the normally closed (N/C) second clutch C2 provided in the vehicle 1 according to the above-described first embodiment is changed to a normally open (hereinafter, also referred to as "N/O") second clutch C2a. The remaining configuration is the same as the configuration of the vehicle 1 according to the above-described first embodiment, so the detailed description thereof will not be repeated.

The second clutch C2a is an N/O clutch as described above. The second clutch C2a is released in a normal state, and is engaged in a state where a hydraulic pressure higher than or equal to a predetermined engagement hydraulic pressure P2a is supplied.

Figure 8:
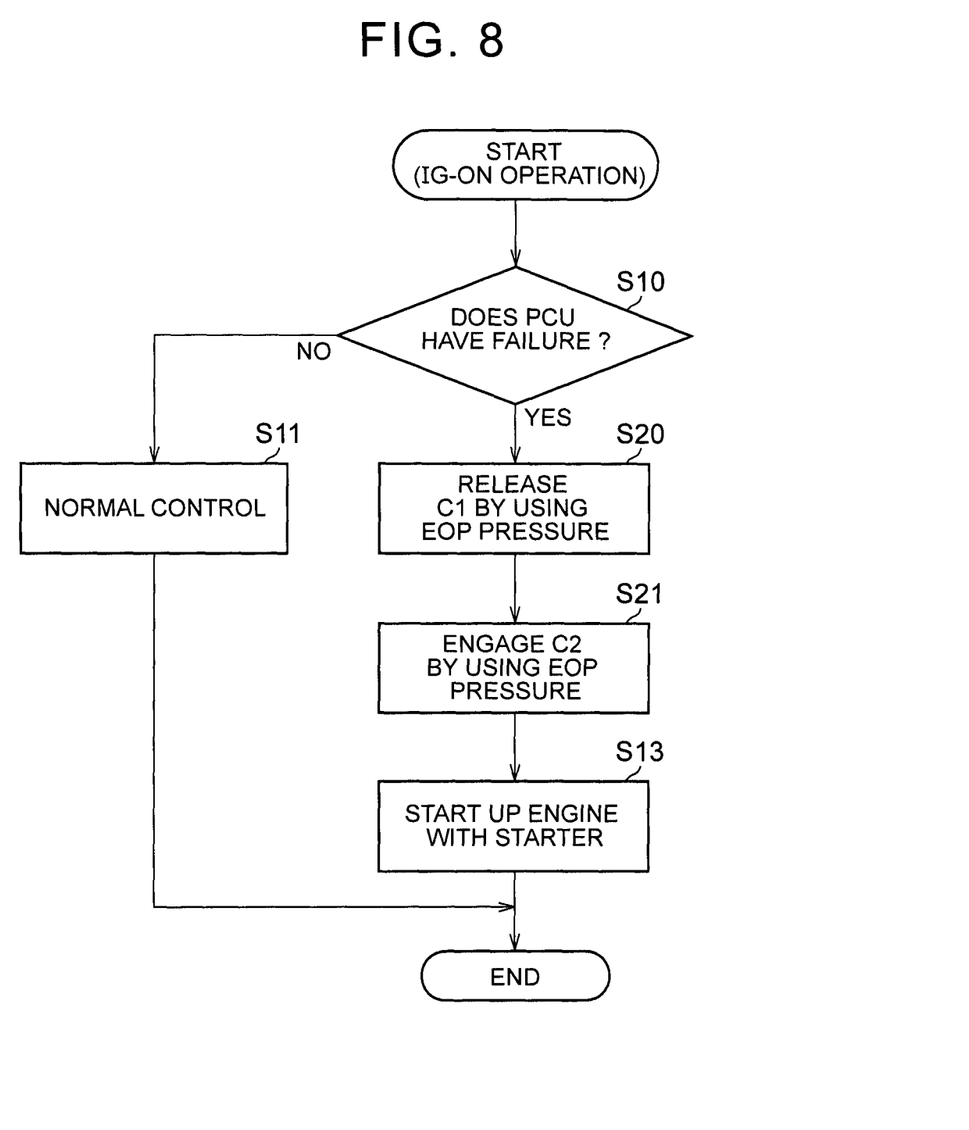
FIG. 8 is a second flowchart that shows the procedure of the ECU.

FIG. 8 is a flowchart that shows the procedure of PCU-abnormality start-up control to be executed by the ECU 100 according to the second embodiment. This flowchart is started when the IG-on operation is made in the IG-off state (the state where the vehicle 1a is stopped in the P range). Both the electric oil pump EOP and the mechanical oil pump MOP are stopped at the time of the start of this flowchart, so both the first clutch C1 and the second clutch C2a are in the normal state, that is, the first clutch C1 is engaged and the second clutch C2a is released.

In S10, the ECU 100 determines whether the PCU 21 has a failure. When the PCU 21 has no failure (NO in S10), the ECU 100 executes normal control. The processes of S10 and S11 shown in FIG. 8 are the same as the above-described processes of S10 and S11 shown in FIG. 3, so the detailed description thereof will not be repeated.

When the PCU 21 has a failure (YES in S10), the ECU 100, in S20, controls the solenoid valve 61 of the hydraulic circuit 60 such that the first clutch C1 is released using the EOP pressure by operating the electric oil pump EOP. In addition, the ECU 100, in S21, controls the solenoid valve 62 of the hydraulic circuit 60 such that the second clutch C2a is engaged using the EOP pressure.

After that, the ECU 100, in S13, starts up the engine 10 with the use of the starter 11. The process of S13 shown in FIG. 8 is the same as the above-described process of S13 shown in FIG. 3, so the detailed description thereof will not be repeated.

Figure 9:
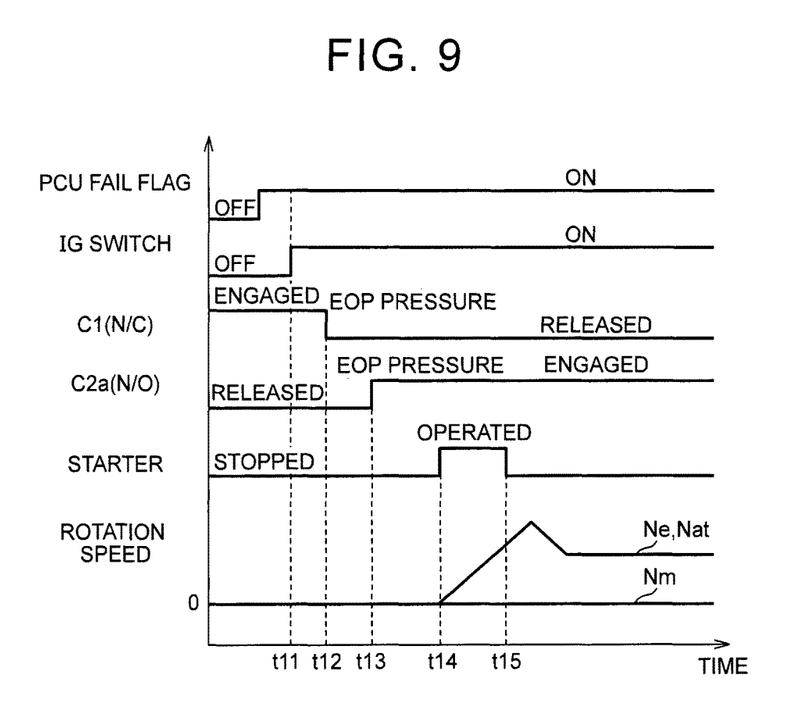
FIG. 9 is a first timing chart that shows an example of changes in engine rotation speed Ne, MG rotation speed Nm and input shaft rotation speed Nat in the case where the ECU executes PCU-abnormality start-up control.

FIG. 9 is a timing chart that shows an example of changes in engine rotation speed Ne, MG rotation speed Nm and input shaft rotation speed Nat in the case where the ECU 100 executes PCU-abnormality start-up control according to the second embodiment.

When the IG-on operation is made at time t11, because the PCU fail flag is in the on state, the first clutch C1 is released by using the EOP pressure at time t12, and the second clutch C2a is engaged by using the EOP pressure at time t13. Thus, the MG 20 is disconnected from the input shaft 31 of the automatic transmission unit 30, and the engine 10 is connected to the input shaft 31 of the automatic transmission unit 30.

Thereafter, at time t14, cranking of the engine 10 is started with the use of the starter 11. At time t15, ignition control over the engine 10 is started.

The engine rotation speed Ne changes as a result of start-up of the engine 10 after time t14. However, the first clutch C1 is released, and the MG 20 is disconnected from the input shaft 31 of the automatic transmission unit 30, so the MG rotation speed Nm is kept at zero without any change. Therefore, even when a short circuit is formed between the MG 20 and the PCU 21 as a result of a failure of the PCU 21, it is possible to suppress flow of an overcurrent through the short circuit.

In addition, the second clutch C2a is engaged, and the engine 10 is connected to the input shaft 31 of the automatic transmission unit 30, so it is possible to synchronize the engine rotation speed Ne with the input shaft rotation speed Nat (that is, to transmit the power of the engine 10 to the input shaft 31 of the automatic transmission unit 30) from the beginning of start-up of the engine 10. Therefore, in comparison with the case where the engine 10 is started up in a state where the second clutch C2a is released, the power of the engine 10 is allowed to be early transmitted to the drive wheels, so it is possible to suppress a delay in response of transmission of driving force.

As described above, when the IG-on operation is made and the PCU 21 has a failure, the ECU 100 according to the present embodiment starts up the engine 10 in a state where the first clutch C1 is released and the second clutch C2a is engaged (a state where the MG 20 is disconnected from the input shaft 31 of the automatic transmission unit 30 and the engine 10 is connected to the input shaft 31 of the automatic transmission unit 30). Therefore, at start-up of the engine 10, it is possible to transmit the power of the engine 10 to the input shaft 31 of the automatic transmission unit 30 while not rotating the MG 20. Therefore, in comparison with the case where the engine 10 is started up in a state where the second clutch C2a is released, it is possible to suppress a delay in response of transmission of driving force.

Third Embodiment

In the above-described vehicle 1a shown in FIG. 7, when the IG-on operation is made in the IG-off state and the PCU 21 has a failure, the ECU 100 according to the above-described second embodiment starts up the engine 10 in a state where the first clutch C1 is released and the second clutch C2a is engaged by using the EOP pressure. However, large hydraulic pressure is required to release the first clutch C1 configured as an N/C type, and there is a concern that the size of the electric oil pump EOP increases in order to release the first clutch C1 by using the EOP pressure.

In the above-described vehicle 1a shown in FIG. 7, when the IG-on operation is made in the IG-off state and the PCU 21 has a failure, the ECU 100 according to the third embodiment starts up the engine 10 with the use of the starter 11 and, after start-up of the engine 10, engages the second clutch C2a by using the EOP pressure. The ECU 100 releases the first clutch C1 by using the MOP pressure after the mechanical oil pump MOP has operated as a result of an increase in the input shaft rotation speed Nat under the influence of the engine rotation speed Ne as the second clutch C2a is engaged.

Figure 10:
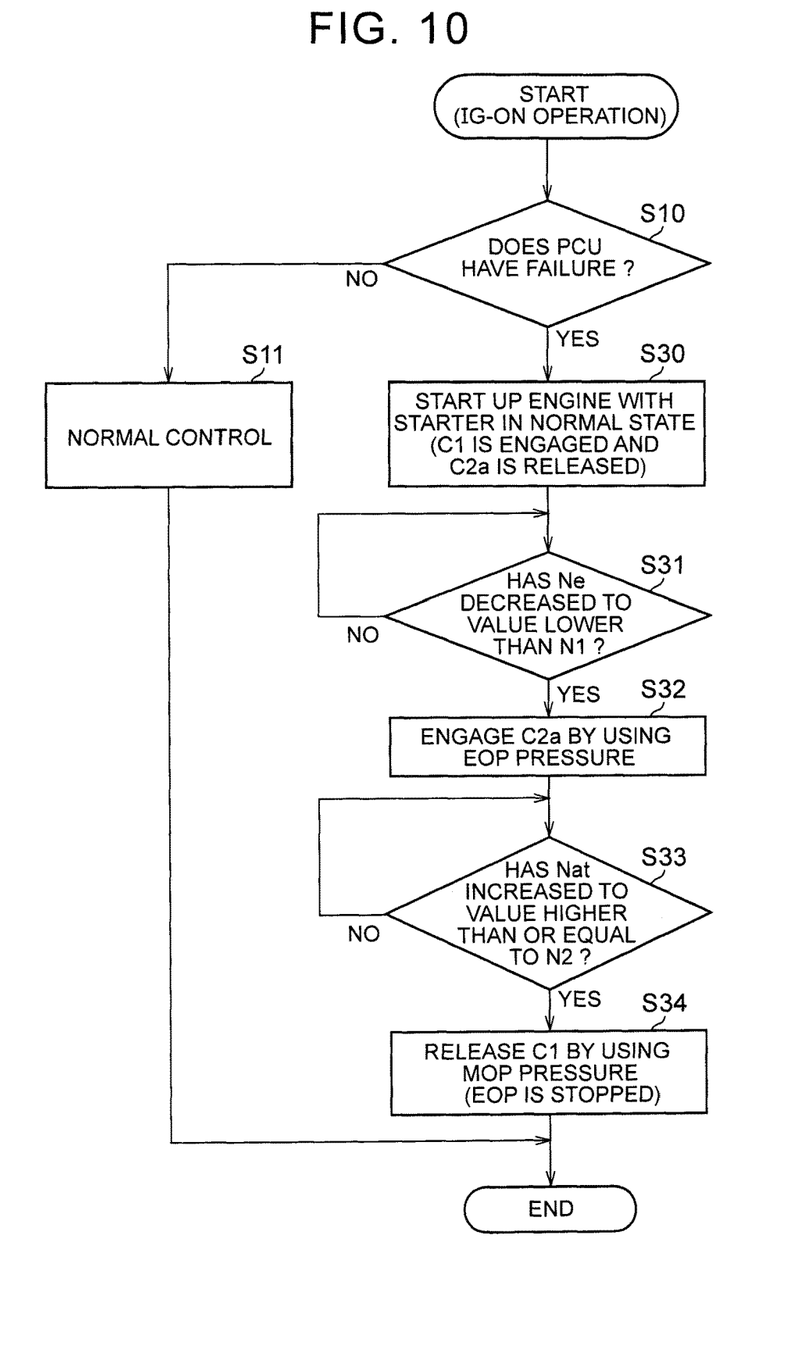
FIG. 10 is a third flowchart that shows the procedure of the ECU.

FIG. 10 is a flowchart that shows the procedure of PCU-abnormality start-up control to be executed by the ECU 100 according to the third embodiment. This flowchart is started when the IG-on operation is made in the IG-off state. At the time of the start of this flowchart, both the first clutch C1 and the second clutch C2a are in the normal state, that is, the first clutch C1 is engaged and the second clutch C2a is released.

In S10, the ECU 100 determines whether the PCU 21 has a failure. When the PCU 21 has no failure (NO in S10), the ECU 100 executes normal control. The processes of S10 and S11 shown in FIG. 10 are the same as the above-described processes of S10 and S11 shown in FIG. 3 or FIG. 8, so the detailed description thereof will not be repeated.

When the PCU 21 has a failure (YES in S10), the ECU 100, in S30, starts up the engine 10 with the use of the starter 11 in the normal state (the first clutch C1 is engaged and the second clutch C2a is released).

After engine start-up, the ECU 100 determines in S31 whether the engine rotation speed Ne has decreased to a value lower than a predetermined rotation speed N1. The predetermined rotation speed N1 is a rotation speed below which a current that flows between the MG 20 and the PCU 21 because of the counter-electromotive force of the MG 20 becomes lower than a permissible value. The counter-electromotive force of the MG 20 is generated by rotation of the MG 20 as the second clutch C2a is engaged. The value of the predetermined rotation speed N1 is determined in advance by an experiment, or the like.

When the engine rotation speed Ne has not decreased to the value lower than the predetermined rotation speed N1 (NO in S31), the ECU 100 waits until the engine rotation speed Ne decreases to the value lower than the predetermined rotation speed N1.

When the engine rotation speed Ne has decreased to the value lower than the predetermined rotation speed N1 (YES in S31), the ECU 100, in S32, engages the second clutch C2a by using the EOP pressure.

After the second clutch C2a has been engaged, the ECU 100 determines in S33 whether the input shaft rotation speed Nat has increased to a value higher than or equal to a predetermined rotation speed N2. The predetermined rotation speed N2 is a rotation speed at or above which the MOP pressure is higher than the release hydraulic pressure P1 of the first clutch C1. The value of the predetermined rotation speed N2 is determined in advance by an experiment, or the like. In the present embodiment, the predetermined rotation speed N2 is set to a value lower than the predetermined rotation speed N1.

When the input shaft rotation speed Nat has not increased to the value higher than or equal to the predetermined rotation speed N2 (NO in S33), the ECU 100 waits until the input shaft rotation speed Nat increases to the value higher than or equal to the predetermined rotation speed N2.

When the input shaft rotation speed Nat has increased to the value higher than or equal to the predetermined rotation speed N2 (YES in S33), the ECU 100, in S34, releases the first clutch C1 by using the MOP pressure. At this time, the ECU 100 stops the electric oil pump EOP.

Figure 11:
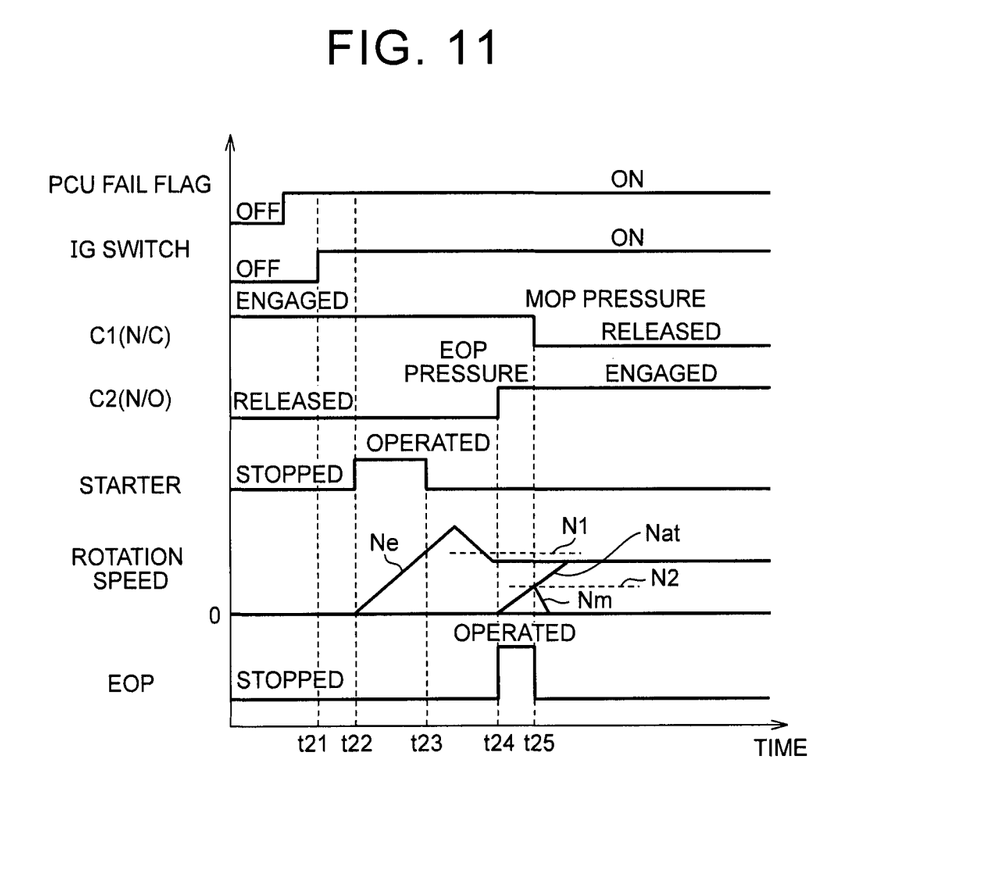
FIG. 11 is a second timing chart that shows an example of changes in engine rotation speed Ne, MG rotation speed Nm and input shaft rotation speed Nat in the case where the ECU executes PCU-abnormality start-up control.

FIG. 11 is a timing chart that shows changes in engine rotation speed Ne, MG rotation speed Nm and input shaft rotation speed Nat in the case where the ECU 100 executes PCU-abnormality start-up control according to the third embodiment.

When the IG-on operation is made at time t21, because the PCU fail flag is in the on state, cranking of the engine 10 is started with the use of the starter 11 in the normal state (the first clutch C1 is engaged and the second clutch C2a is released) at time t22, and ignition control over the engine 10 is started at time t23.

As is already described with reference to FIG. 4, the engine rotation speed Ne temporarily increases to a relatively high value immediately after the start of ignition control; however, after a while, the engine rotation speed Ne begins to decrease toward a rotation speed corresponding to a throttle opening degree. In consideration of this point, the ECU 100 sets the second clutch C2a in the released state at the beginning of start-up of the engine 10, and engages the second clutch C2a at time t24 at which the engine rotation speed Ne has decreased to the value lower than the predetermined rotation speed N1.

Thus, in comparison with the case where the second clutch C2a is set to the engaged state before time t24 (from the beginning of engine start-up), it is possible to suppress the amount of increase in the input shaft rotation speed Nat through engagement of the second clutch C2a. In addition, the predetermined rotation speed N1 is set to a rotation speed below which a current that flows between the MG 20 and the PCU 21 because of the counter-electromotive force of the MG 20 is smaller than the permissible value. The counter-electromotive force of the MG 20 occurs as the second clutch C2a is engaged. Therefore, even when the MG rotation speed Nm increases to the rotation speed N1 as the second clutch C2a is engaged, it is possible to suppress a current that flows between the MG 20 and the PCU 21 to a value smaller than the permissible value.

As a result of the fact that the second clutch C2a has been engaged at time t24, the input shaft rotation speed Nat begins to increase under the influence of the engine rotation speed Ne. The MOP pressure also begins to increases with an increase in the input shaft rotation speed Nat. When the input shaft rotation speed Nat increases to a value higher than the predetermined rotation speed N2 at time t25, the MOP pressure becomes higher than the release hydraulic pressure P1 of the first clutch C1. The ECU 100 releases the first clutch C1 by using the MOP pressure at time t25 at which the input shaft rotation speed Nat has increased to the value higher than the predetermined rotation speed N2. Thus, it is possible to ensure the hydraulic pressure for releasing the second clutch C2a by using not the EOP pressure but the MOP pressure. Therefore, in comparison with the case where the second clutch C2a is released by using the EOP pressure, it is possible to suppress the maximum value of the EOP pressure to a lower value, so it is possible to reduce the size of the electric oil pump EOP.

At time t25, the MG rotation speed Nm, as well as the input shaft rotation speed Nat, has reached the predetermined rotation speed N2. However, after the first clutch C1 has been released at time t25, the MG 20 is disconnected from the input shaft 31 of the automatic transmission unit 30, so the MG rotation speed Nm is decreased to zero. That is, the MG rotation speed Nm just increases to the rotation speed N2 lower than the predetermined rotation speed N1, and, after that, decreases to zero. Therefore, it is possible to appropriately suppress a current that flows between the MG 20 and the PCU 21 to a value smaller than the permissible value.

As described above, when the IG-on operation is made and the PCU 21 has a failure, the ECU 100 according to the present embodiment initially starts up the engine 10 with the use of the starter 11, and, after start-up of the engine 10, engages the second clutch C2a by using the EOP pressure. The ECU 100 releases the first clutch C1 by using the MOP pressure at the timing at which the input shaft rotation speed Nat has increased to the value higher than the predetermined rotation speed N2 as the second clutch C2a is engaged. Thus, it is possible to ensure the hydraulic pressure for releasing the first clutch C1 by using not the EOP pressure but the MOP pressure. Therefore, it is possible to reduce the size of the electric oil pump EOP. The invention may be implemented by using two or more ECUs.

The embodiments described above should be regarded as only illustrative in every respect and not restrictive. The scope of the invention is defined by the appended claims rather than the description of the above embodiments. The scope of the invention is intended to encompass all modifications within the scope of the appended claims and equivalents thereof.

The invention claimed is:

1. A driving system for a vehicle,
the vehicle including:
   an engine,
   an automatic transmission including an input shaft connected to an output shaft of the engine,
   a power control circuit,
   a motor generator connected to the input shaft of the automatic transmission, the motor generator being configured to operate on electric power that is supplied from the power control circuit, and
   a rotary electric machine configured to start up the engine by operating on electric power different from the electric power that is supplied from the power control circuit,
the driving system comprising:
   a clutch mechanism configured to transmit power between the engine and the motor generator or interrupt transmission of power between the engine and the motor generator, the clutch mechanism including a first clutch and a second clutch,
      the first clutch being provided between the motor generator and the input shaft of the automatic transmission, and
      the second clutch being provided between the output shaft of the engine and the input shaft of the automatic transmission, and
   at least one electronic control unit configured to control the engine, the rotary electric machine and the clutch mechanism,
      the electronic control unit being configured to:
         i) determine whether or not the power control circuit has a failure, and
         ii) when the power control circuit has the failure, execute start-up control, the start-up control being control for starting up the engine by operating the rotary electric machine in a state where the first clutch mechanism is released.

2. The driving system according to claim 1, wherein the start-up control is control for starting up the engine by operating the rotary electric machine in a state where the first clutch is released and the second clutch is engaged.

3. A driving system for a vehicle,
the vehicle including:
   an engine,
   an automatic transmission including an input shaft connected to an output shaft of the engine,
   a power control circuit,
   a motor generator connected to the input shaft of the automatic transmission, the motor generator being configured to operate on electric power that is supplied from the power control circuit, and
   a rotary electric machine configured to start up the engine by operating on electric power different from the electric power that is supplied from the power control circuit,
the driving system comprising:
   a clutch mechanism configured to transmit power between the engine and the motor generator or interrupt transmission of power between the engine and the motor generator, the clutch mechanism including a first clutch and a second clutch, the first clutch being provided between the motor generator and the input shaft of the automatic transmission, and the second clutch being provided between the output shaft of the engine and the input shaft of the automatic transmission, and at least one electronic control unit configured to control the engine, the rotary electric machine and the clutch mechanism, the electronic control unit being configured to:
i) determine whether or not the power control circuit has a failure, and
ii) when the power control circuit has the failure, execute start-up control, the start-up control being control for starting up the engine by operating the rotary electric machine in a state where the second clutch is released.

4. The driving system according to claim 3, wherein:
the vehicle further includes an electric oil pump,
the electronic control unit is configured to engage the second clutch by using a discharge hydraulic pressure of the electric oil pump when a rotation speed of the engine has decreased to a value lower than a first rotation speed after the engine has been started up in a state where the second clutch is released, and
the first rotation speed is a rotation speed when a current that flows between the motor generator and the power control circuit is smaller than a permissible value due to a counter-electromotive force that generates through rotation of the motor generator in a state where the second clutch is engaged.

5. The driving system according to claim 4, wherein:
the first clutch is configured such that the first clutch engages when no hydraulic pressure is supplied and the first clutch is released when a hydraulic pressure higher than or equal to a predetermined hydraulic pressure is supplied,
the vehicle further includes a mechanical oil pump connected to the input shaft of the automatic transmission,
the electronic control unit is configured to release the first clutch by using a discharge hydraulic pressure of the mechanical oil pump when a rotation speed of the input shaft of the automatic transmission has increased to a value higher than a second rotation speed while the second clutch is engaged by using the discharge hydraulic pressure of the electric oil pump after the engine has been started up, and
the second rotation speed is a rotation speed when the discharge hydraulic pressure of the mechanical oil pump is higher than the predetermined hydraulic pressure.

* * * * *